United States Patent [19]
Aelony et al.

[11] 3,876,657
[45] Apr. 8, 1975

[54] PREPARATION OF 1-SUBSTITUTED-2-IMIDAZOLIDINONES

[75] Inventors: David Aelony; William J. McKillip, both of Minneapolis, Minn.

[73] Assignee: Ashland Oil, Inc., Columbus, Ohio

[22] Filed: May 21, 1973

[21] Appl. No.: 362,246

Related U.S. Application Data

[63] Continuation of Ser. No. 149,861, June 3, 1971.

[52] U.S. Cl. ............................. 260/309.7; 424/273
[51] Int. Cl. ............................................ C07d 49/30
[58] Field of Search ................................. 260/309.7

[56] References Cited
UNITED STATES PATENTS

| | | | |
|---|---|---|---|
| 2,430,874 | 11/1947 | Hale | 260/309.7 |
| 2,812,333 | 11/1957 | Steele | 260/309.7 |
| 2,883,321 | 4/1959 | Gaertner | 260/309.7 |
| 2,985,663 | 5/1961 | Carmack et al. | 260/309.7 |
| 2,993,906 | 7/1961 | Sprenger et al. | 260/309.7 |
| 3,184,460 | 5/1965 | Akkerman et al. | 260/309.7 |
| 3,304,327 | 2/1967 | Rapaelian et al. | 260/309.7 |

FOREIGN PATENTS OR APPLICATIONS

| 1,513,142 | 1/1968 | France | 260/309.7 |
|---|---|---|---|

OTHER PUBLICATIONS

Hofmann Imidazole and its Derivatives, Part I, pages 226–231, N.Y., Interscience, 1953, QD401.H6.
Aelony, et al., J. Heterocyclic Chemistry, Vol. 9, pages 687 to 690 (June 1972).

*Primary Examiner*—John D. Randolph

[57] ABSTRACT

A method is disclosed for the preparation of 1-substituted-2-imidazolidinones wherein a tertiary amine mono-imide of the formula

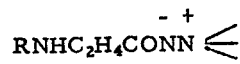

is thermolytically rearranged to provide said imidazolidinone structure carrying the R substituent in the number one position thereof. The disclosure further sets forth a generalized method for obtaining the applicable tertiary amine mono-imides involving the initial preparation of a Michael mono-adduct of an alkyl acrylate and a primary amine, followed by conversion of the adduct to the tertiary amine mono-imide by alternate procedures. The substituted 2-imidazolidinones as a class have recognized utility as bactericides, central nervous system depressants, plant growth promoters, female fly sterilants, adhesives, textile treating agents and as monomers for deriving polymers and copolymers.

3 Claims, No Drawings

PREPARATION OF 1-SUBSTITUTED-2-IMIDAZOLIDINONES

This is a continuation of application Ser. No. 149,861, filed June 3, 1971.

BACKGROUND OF THE INVENTION

1. Field of the Invention

This invention relates to an improved method for the preparation of 1-substituted-2-imidazolidinones.

2. Description of the Prior Art

Heretofore, a variety of methods have been proposed for the preparation of 1-substituted-2-imidazolidinones which as a class have recognized utility as bactericides, central nervous system depressants, plant growth promoters, female fly sterilants, adhesives, textile treating agents, and as monomers for deriving polymers and copolymers. The methods proposed in the prior art, however, are not general, the yields are usually poor and the procedures involved are invariably cumbersome and expensive to carry out. A description of such prior art practices can be found in the following references: (a) J. Org. Chem. 1921, 1,546–7 (1956); (b) JCS 1968, 2,350–5 (1946); (c) JCS 1958, 4,531–6; (d) Bull., Soc. Chim. France, 1963, 323–8; (e) Ann. 698, 180–5; (f) J. Med. Chem. 9, 858, (1966); and (g) U.S. Pat. No. 2,518,264.

The advantage of the process of the present invention primarily resides in the simplicity in achieving the conversion of the applicable starting materials into the final derivatives coupled with the realization of excellent overall yields.

SUMMARY OF THE INVENTION

In accordance with the present invention, a tertiary amine monoimide in which the acyl residue thereof structurally conforms to the grouping

is thermolytically rearranged to provide the 2-imidazolidinone carrying the said R radical in the number one position thereof. The R substituent can be either alkyl, alkenyl, aryl, cyclohydrocarbyl, aralkyl or a heterocyclic organo radical.

In deriving the substituted imidazolidinones by the practice of this invention, preferred prior art procedures are availed of in obtaining the applicable tertiary amine mono-imides. The initial step in this sequence comprises effecting the well-known Michael addition of a primary amine with an acrylate to provide the mono-adduct. In the subsequent procedure or step, the Michael adduct is converted to the tertiary amine mono-imide by either of two hitherto proposed ways. One route involves the reaction of the adduct with a trialkyl hydrazinium halide in the presence of a suitable dehydrohalogenating agent, whereas in the alternate route the adduct is reacted with an unsymmetrical disubstituted hydrazine and a lower alkylene oxide. For illustrative purposes, the aforesaid reactions are shown schematically below wherein R has the above-indicated meaning and any ultimate leaving group except that provided by an epoxide reactant is shown as methyl for convenience.

(I) $RNH_2 + CH_2 = CHCOOCH_3 \rightarrow RNHC_2H_4COOCH_3$

(IIa) $RNHC_2H_4COOCH_3 + H_2NN(CH_3)_3 X^- \xrightarrow{-OCH_3} RNHC_2H_4CONN(CH_3)_3^{-+}$ or

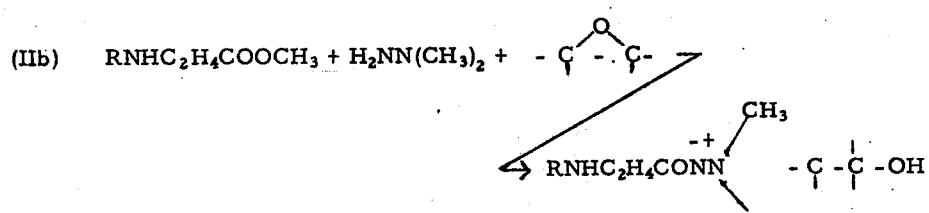

(IIb) $RNHC_2H_4COOCH_3 + H_2NN(CH_3)_2 + $

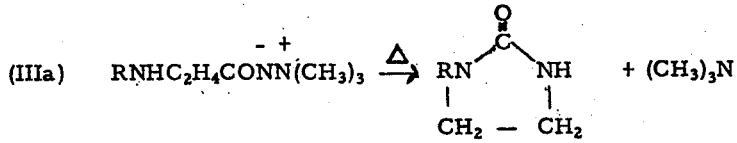

(IIIa) $RNHC_2H_4CONN(CH_3)_3^{-+} \xrightarrow{\Delta}$

DESCRIPTION OF THE PREFERRED EMBODIMENTS

As noted in the above summary, the tertiary amine mono-imides which can be thermolytically rearranged to provide the imidazolidinones in accordance with this invention are ultimately derived from a primary amine. The primary amine is first reacted with an ester, preferably a lower alkyl ester of acrylic acid in accordance with the Michael addition reaction. For this purpose, the organic moiety of the amine can be as previously indicated, either an alkyl, alkenyl, aryl, cyclohydrocarbyl, aralkyl or a heterocyclic organo radical.

The term "aryl" as employed herein is meant to define an organic radical in which the unsatisfied valence is at a carbon atom of the aromatic nucleus. Likewise, the term is embracive of those compounds wherein the aromatic nucleus contains other substituents besides hydrogen. Accordingly, in addition to aromatic amines such as aniline and naphthylamine, the aforesaid term contemplates substituted compounds as m-chloroaniline, toluidine, xylidine, mesidine and the like. The term "cyclohydrocarbyl radical" is intended to define any cyclic non-aromatic monovalent radical, saturated or unsaturated, wherein the ring nucleus consists of carbon and hydrogen. Cyclohexylamine is typically representative of an applicable amine of this type. A further enumeration of useful primary amines for deriving the 1-substituted-2-imidazolidinones includes such as allylamine, butylamine, decylamine, octadecylamine, 1-fluorenamine, benzylamine, 2-furanamine, 2-p-dioxanamine, 3-pyranylamine, biphenylamine, phenbutylamine, furfurylamine, 1-indanethylamine, 3-picolylamine and the like.

The Michael addition yields are usually excellent. Since the aliphatic amines are strong enough bases, no catalyst is required to effect adduction. The aromatic amines, on the other hand, necessitate the use of base catalysts. A particularly useful catalyst for this purpose is triethylamine. In those instances where an aromatic amine of low reactivity is employed, it is desirable to use an excess of the amine, which excess can be readily recovered. With certain amines, substantial yields of the diadduct are obtained. However, this poses no significant problem except to adversely affect yield, as the mono- and diadduct can be easily separated by fractionation. The lower alkyl esters of acrylic acid are applicable for use in preparing the Michael adduct. Methylacrylate is, however, the preferred acrylate although the higher alkyl acrylates can be utilized to advantage in situations where an excess of amine is employed in order to minimize amide formation. For most addition reactions, a stoichiometric proportion of amine to acrylate is observed.

Two noteworthy ways have been developed recently for converting a carboxylic acid ester to the corresponding tertiary amine mono-imide or mono-aminimide. The underlying reaction of one of these methods is shown in the equation designated (IIa) hereinabove. As can be noted, the ester, in the present context the Michael addition product, is reacted with a trialkyl hydrazinium halide, preferably the chloride salt, in the presence of a strong base to yield the aminimide. Since the reaction of an ester with the hydrazinium salt is a nucleophilic displacement type reaction, it is preferable to carry out the reaction in an aprotic solvent. Aprotic solvents are those polar organic solvents which niether yield a proton to the solute nor gain one from it. Examples of applicable aprotic solvents include the lower alknaols, dimethyl sulfoxide, acetonitrile, dioxane and the like. The preferred solvents are the lower alkanols, especially isopropanol. Further details relative to this method for deriving the aminimides can be found in U.S. Ser. No. 14,668 filed Feb. 26, 1970, now U.S. Pat. No. 3,706,800. Additionally, the working examples provided herein are exemplary of the manner for carrying out this method.

The other method referred to hereinabove for deriving a tertiary amine mono-imide is shown in the reaction schematic identified as (IIb) hereinabove. This procedure consists of reacting a carboxylic acid ester with an unsymmetrical disubstituted hydrazine, preferably a dialkyl hydrazine, and a mono-epoxide. Since the epoxide becomes part of the leaving group in the subsequent thermolytic rearrangement of the aminimide, it is desirable to use for the instant purposes a lower alkylene oxide as the mono-epoxide reactant. Further details concerning this applicable method for deriving the aminimides can be found in U.S. Pat. No. 3,485,806.

The gist of the present invention, as mentioned, resides in thermolytically rearranging the aforesaid tertiary amine mono-imides to the corresponding 1-substituted-2-imidazolidinones. This rearrangement is readily accomplished by merely heating the aminimide at a temperature in excess of about 140°C. for the length of time needed to achieve the indicated cyclization. The completion of the rearrangement can be noted by observing the disappearance of the aminimide IR absorption band at 1,585cm$^{-1}$. The thermolysis is best conducted in a relatively dilute solution of the aminimide in a solvent in order to minimize the formation of polyureas at the expense of reduced cyclic monomer yield. Any high boiling inert anhydrous solvent can be used for this purpose, typically representative of which are such as xylene and mesitylene.

In order to illustrate to those skilled in the art the best mode contemplated for carrying out the present invention, the following working example is set forth. As indicated, this example is presented primarily by way of illustration and accordingly, any enumeration of details contained therein should not be construed as a limitation on the invention except to the extent expressed in the appended claims. All parts and percentages given are on a weight basis uniess otherwise indicated.

EXAMPLE

This example is comprised of three parts, of which Part A illustrates a typical preparation of a Michael mono-adduct of a primary amine with methylacrylate; Part B serves to illustrate a generalized method for converting a Michael mono-adduct to the aminimide; and Part C describes the best mode contemplated for implementing the present invention in effecting the thermolysis of an aminimide to provide the corresponding 1-substituted-2-imidazolidinone. Concluding each part of this example, a summary of the results obtained in using a variety of other starting primary amines in connection with particular preparation concerned will be tabularly set forth.

Part A

Michael addition of allylamine to methylacrylate. Methylacrylate in the amount of 176 g. (2.04 mols) was added at once to a solution of 114 g. (2 mols) allylamine in 200 ml of methanol. Reaction was very exothermal and a small amount of allylamine was lost through elullition. The solution was cooled and allowed to stand over a weekend. The product was evaporated at 55°C. at 7 mm and then vacuum fractionated through a pear topped by a 1 inch Vigreaux column. Fraction No. 1 in the amount of 219.6 g. boiled at 40°C. at 0.1 mm. A 3 g. intermediate fraction was collected between 40° and 90°C. at 0.2 mm. The column was then removed and 37 g. distilled below 110°C. at 0.1 mm. The residue weighed 0.8 g. Spectral analysis of the first fraction indicated that it was the mono-adduct showing the following infrared absorption bands; 3,340cm$^{-1}$ (N—H), 3,080cm$^{-1}$ (CH$_2$=CH), 1,740cm$^{-1}$ (C—O). Elemental analysis figures for the mono-adduct product as well as yield and other data for other mono- products prepared by this generalized procedure is set forth in the following Table I.

Table I

Summary of RNHC₂H₄COOCH₃ Preparations

| R | % Yield of Monoadduct | b.p. ° (mm) | m.p.° | Calcd. % C | H | N | Found % C | H | N |
|---|---|---|---|---|---|---|---|---|---|
| N-butyl | 70 | 37 (0.2) | | | | 8.84 | | | 8.37 |
| Allyl | 83.7 | 40 (0.1) | | 58.74 | 9.09 | 9.79 | 58.67 | 9.07 | 9.65 |
| Cyclohexyl | 97.1 | 68 (0.3) | | — | — | 7.57 | — | — | 7.47 |
| Phenyl | 87 | 112–20 (0.4–0.6) | 37 | — | — | 7.82 | — | — | 7.83 |
| m-Chlorophenyl* | 96.2 | 109–13 (0.1) | 40–40.5 | — | — | — | — | — | — |
| m-Tolyl | 80.0 | 121–7 (0.45) | | — | — | — | — | — | — |
| Furfuryl | 76.3 | 77–85 (0.23) | | 60.33 | 7.26 | 7.82 | 59.20 | 7.23 | 7.98 |
| 3-Picolyl | 75.8 | 122–6 (0.2) | | — | — | — | — | — | — |
| 2-Pyridinoethyl | 83.7 | 118–38 (0.3–0.4) | | 63.46 | 7.69 | 13.46 | 63.57 | 7.75 | 14.35 |

* Yield corrected for recovered unreacted m-chloroaniline

Table II

Summary of RNHC₂H₄CONN(CH₃)₃ Synthesis

| R | Yield of Aminimide | m.p. ° | Calcd. % C | H | N | Found % C | H | N |
|---|---|---|---|---|---|---|---|---|
| N-butyl | 85.2 | 34–8 | 59.70 | 11.48 | 20.89 | 59.09 | 11.09 | 20.64 |
| Allyl | 93.3 | Liquid | 58.38 | 10.27 | 22.70 | 58.00 | 10.00 | 22.97 |
| Cyclohexyl | 85.1 | 88 | — | — | — | — | — | — |
| Phenyl | 82.8 | 125–5–6.5 | 65.16 | 8.60 | 19.00 | 65.06 | 8.40 | 19.25 |
| m-Chlorophenyl | 83.9 | 98–99 | 56.36 | 7.04 | 16.44 | 56.81 | 7.04 | 16.62 |
| m-Tolyl | 81.0 | 99.5–100.5 | 66.38 | 8.94 | 17.87 | 66.87 | 8.86 | 18.09 |
| Furfuryl | 93.7 | Liquid | 58.67 | 8.44 | 18.67 | 58.35 | 8.35 | 18.46 |
| 3-Picolyl | Quant. | Liquid | 61.01 | 8.47 | 23.73 | 59.98 | 8.36 | 22.97 |
| 2-Pyridinoethyl | 94.4 | Liquid | 62.40 | 8.80 | 22.40 | 61.94 | 8.75 | 22.47 |

Part B

Trimethylammonium-N-($\beta$-butylpropionyl)imine. Metallic sodium (9.9 g., 0.43 mol) was dissolved in 500 ml boiling isopropanol and 20 ml methanol. The solution was cooled to 50°C. whereupon 47.5 g. of trimethyl hydrazinium chloride were added at once followed by the addition of 68.4 g. of methyl N-butyl-$\beta$-amino-propionate. The reaction mixture was agitated for 5 hours at 55°C. and allowed to stand overnight. The reaction product was filtered and the salt extracted with boiling isopropanol. The combined isopropanol solutions were evaporated in vacuo at 60°C. The residue weighed 73.7 g. (85.2% theory). Recovered product was a nearly colorless supercooled liquid which suddenly crystallized with a considerable amount of heat. Spectral analysis (IR) of the product indicated the characteristic absorption peaks. The elemental analysis data for the aminimide product as well as yield and other data for other aminimide products prepared by this generalized procedure is set forth in the following Table II.

Part C

1-Phenyl-2-Imidazolidinone. Trimethylammonium-N-($\beta$-phenylpropionyl)imine in the amount of 20.1 g. was thermolyzed in 200 ml refluxing dry mesitylene for 5 hours and then allowed to cool. Precipitation began at 100°C. The product was filtered at room temperature and the precipitate washed with ether and dried. The beautiful long needles weighed 13.2 g. (90% theory) and melted at 162° – 2.5°C. The mother liquor was evaporated down to 5 ml, allowed to cool and on filtering yielded 0.4 g. needles m.p. 142° – 160°C. The evaporated second mother liquor yielded 1 g. of a viscous liquid residue. Elemental analysis data for the product are set forth in the following Table III. Additionally, Table III sets forth the data, both analysis and yield, for a variety of other imidazolidinone preparations which were carried out in the same manner described directly hereinabove with the exception that the respective thermolysis procedure was carried out in refluxing xylene for a 48 hour period.

Table III

Thermolyses of Aminimides to 1-Substituted-2-Imidazolidinones

| R | Imidazolidiones | m.p.° | b.p. ° (mm) | Yield of Calcd. % C | H | N | Found % C | H | N |
|---|---|---|---|---|---|---|---|---|---|
| N-butyl | 87.8 | 36–9 | 102(0.3) | 59.15 | 9.86 | 19.72 | 59.45 | 9.66 | 20.29 |
| Allyl | 82.4 | 56.5–8 | 95(0.25) | 57.14 | 7.94 | 22.22 | 57.74 | 7.77 | 22.25 |
| Cyclohexyl | 82.4 | 167–7.5 | — | 64.28 | 9.52 | 16.67 | 64.83 | 9.51 | 16.77 |

Table III—Continued

Thermolyses of Aminimides to 1-Substituted-2-Imidazolidinones

| R | Imidazoli-diones | m.p.° | b.p.° (mm) | Calcd. % C | Calcd. % H | Calcd. % N | Found % C | Found % H | Found % N |
|---|---|---|---|---|---|---|---|---|---|
| Phenyl* | 90.0 | 162–2.5 | — | — | — | — | — | — | — |
| Phenyl | 85.0 | 162–2.5 | — | — | — | — | — | — | — |
| m-Chloro-phenyl | 64.0 | 126–6.5 | — | 54.96 | 4.58 | 14.25 | 55.67 | 4.48 | 14.52 |
| m-Tolyl | 84.5 | 142.5–3 | — | — | — | — | — | — | — |
| Furfuryl | 61.0 | 97.5 | 131–5 (0.3) | 57.83 | 6.02 | 16.87 | 57.72 | 6.09 | 17.05 |
| 3-Picolyl | 31.0 | 92–3.5 | — | 61.02 | 6.21 | 23.73 | 61.42 | 6.08 | 24.36 |
| 2-Pyridi-noethyl | 34.6 | 93–4.5 | — | 62.83 | 6.81 | 22.00 | 63.33 | 6.69 | 22.69 |

*Thermolysis was carried out in boiling mesitylene for 5 hrs instead of in xylene for 48 hrs.

What is claimed is:

1. A method for the preparation of an imidazolidinone of the formula:

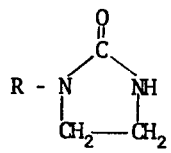

wherein R represents an alkyl, alkenyl, aryl, cyclohydrocarbyl, aralkyl, picolyl, furfuryl, pyranyl, furyl, pyridoethyl or dioxyl radical which comprises effecting the thermolytic rearrangement at a temperature of at least about 140° C. in an inert anhydrous solvent of a tertiary amine mono-imide having the formula:

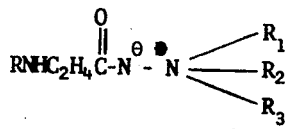

wherein R has the above indicated meaning and wherein $R_1$ and $R_2$ each represents lower alkyl and $R_3$ represents lower alkyl or hydroxy lower alkyl, to provide the corresponding 1-substituted-2-imidazolidinone.

2. A method in accordance with claim 1 wherein said tertiary amine mono-imide is prepared by initially reacting a lower alkyl acrylate and an amine of the formula $RNH_2$ to provide a Michael mono-adduct having the formula:

RNHC₂H₄COO-lower alkyl in which R has the meaning as defined in claim 1, and thereupon reacting said adduct in an aprotic organic solvent with a tri(lower)alkyl hydrazinium chloride in the presence of about an equivalent amount based on said hydrazinium salt of a lower alkoxide of an alkali metal to provide the aminimide.

3. A method in accordance with claim 1 wherein said tertiary amine mono-imide is prepared by initially reacting a lower alkyl acrylate and an amine of the formula $RNH_2$ to provide a Michael mono-adduct having the formula:

RNHC₂H₄COO-lower alkyl in which R has the meaning as defined in claim 1, and thereupon, reacting said adduct with an unsymmetrical lower dialkyl substituted hydrazine and a lower alkylene oxide to provide the aminimide.

* * * * *